(12) United States Patent
Balasubramaniam et al.

(10) Patent No.: US 10,397,897 B2
(45) Date of Patent: Aug. 27, 2019

(54) METHODS FOR IMPROVING PAGING TYPE2 PERFORMANCE IN DUAL SIM DUAL STANDBY (DSDS) DEVICES AND APPARATUS THEREFOR

(71) Applicant: Samsung Electronics Co., Ltd., Suwon-si, Gyeonggi-do (KR)

(72) Inventors: Mohanraja Balasubramaniam, Bangalore (IN); Varun Vanama, Bangalore (IN); Arun Raj Rajendran, Bangalore (IN); Kirti Keshav, Bangalore (IN)

(73) Assignee: Samsung Electronics Co., Ltd., Gyeonggi-do (KR)

(*) Notice: Subject to any disclaimer, the term of this patent is extended or adjusted under 35 U.S.C. 154(b) by 0 days.

(21) Appl. No.: 15/933,744

(22) Filed: Mar. 23, 2018

(65) Prior Publication Data

US 2018/0288732 A1 Oct. 4, 2018

(30) Foreign Application Priority Data

Mar. 31, 2017 (IN) .............................. 201741011832

(51) Int. Cl.
*H04L 1/16* (2006.01)
*H04W 68/00* (2009.01)
*H04W 48/16* (2009.01)
*H04W 76/19* (2018.01)
*H04W 88/04* (2009.01)
*H04W 76/15* (2018.01)

(52) U.S. Cl.
CPC ......... *H04W 68/005* (2013.01); *H04L 1/1642* (2013.01); *H04W 48/16* (2013.01); *H04W 76/19* (2018.02); *H04W 76/15* (2018.02); *H04W 88/04* (2013.01)

(58) Field of Classification Search
CPC ... H04W 68/005; H04W 76/19; H04W 48/16; H04W 56/0855; H04L 1/1642; H04L 63/0853
USPC ...................................................... 455/458
See application file for complete search history.

(56) References Cited

U.S. PATENT DOCUMENTS

| | | | |
|---|---|---|---|
| 9,210,688 B2 | 12/2015 | Kanamarlapudi et al. | |
| 2015/0098445 A1* | 4/2015 | Chakravarthy | H04W 36/14 370/331 |
| 2015/0237597 A1* | 8/2015 | Kanamarlapudi | H04W 68/02 455/458 |
| 2015/0295692 A1 | 10/2015 | Gowda et al. | |
| 2016/0315736 A1* | 10/2016 | Dwarakanath | H04W 24/02 |

(Continued)

*Primary Examiner* — William Nealon
(74) *Attorney, Agent, or Firm* — Harness, Dickey & Pierce, P.L.C.

(57) ABSTRACT

Some example embodiments disclose methods for improving Paging Type2 performance in Dual Sim Dual Standby (DSDS) devices, wherein the methods include transmitting a status Packet Data Unit (PDU) for a Signaling Radio Bearer (SRB) to a network; initiating a first timer in response to the transmitting the status PDU; blocking a radio frequency tune away to a first Subscriber Identity Module (SIM) if one or more missing PDUs are not received before expiry of the first timer; initiating a second timer in response to the blocking the RF tune away; and retaining, by a second SIM, radio frequency resources until expiry of the second timer or the one or more missing PDUs are received from the network.

16 Claims, 10 Drawing Sheets

(56) References Cited

U.S. PATENT DOCUMENTS

2018/0070327 A1\* 3/2018 Qureshi ............ H04W 56/0055
2018/0077728 A1\* 3/2018 Shi ........................ H04W 76/10

\* cited by examiner

METHODS FOR IMPROVING PAGING TYPE2 PERFORMANCE IN DUAL SIM DUAL STANDBY (DSDS) DEVICES AND APPARATUS THEREFOR

PRIORITY

This application claims priority under 35 U.S.C. § 119(a) to an Indian Patent Application Serial No. 201741011832 (CS), which was filed on Mar. 31, 2017 in the Indian Intellectual Property Office, the entire disclosure of which is incorporated herein by reference.

TECHNICAL FIELD

Some example embodiments relate to wireless communication systems and more particularly to methods for improving Paging Type2 performance in Dual Sim Dual Standby (DSDS) devices.

BACKGROUND

Dual sim dual standby (DSDS) devices are designed to share a single radio frequency resource (referred to hereinafter interchangeably as the RF or the RF resource(s)) between two subscriber identity modules (SIMs). Each SIM is associated with a subscription and a protocol stack. So, at any point of time, the RF is dedicated to only one SIM. The RF may not be associated with an intended subscription when a network tries to page the DSDS device due to mobile termination (MT) call, SMS, etc. Even if the RF is acquired after the activity of the other subscription, it still introduces delay in receiving a page message or sometimes not receiving a page message as the network will retransmit the page message. Sometimes the network may terminate the call establishment procedure if the DSDS device does not respond to the page message within a specified time. This may contribute to degradation of the user experience of the caller when an MT call is made to the intended subscription. Since the DSDS device may be in any state when paging is expected, different mechanisms are proposed to overcome specific scenarios.

For instance, consider a scenario, wherein packet-switch (PS) session is established in the first SIM (SIM1) (CELL_DCH) and the second SIM (SIM2) is in idle mode. During the ongoing PS session of SIM1, RF activity in SIM1 may be interrupted due to paging, measurements, cell search or system information block (SIB) reading on SIM2. When the RF is tuned to SIM2, the probability of missing packet data units (PDU's) of a signaling message on SIM1 is relatively high. This situation may cause the first subscription to miss PDU sequence numbers (SN's) and may render the layer-2 recovery procedure ineffective. As part of the layer-2 recovery procedure, status reports are sent to the network to indicate missed SN's for re-transmission. However, if the RF is not tuned to SIM1, re-transmissions may not be received which may stall reception. Even in a case where paging type 2 PDUs are received at the DSDS device, layer-2 (L2) will not forward it to radio resource control (RRC) as in most cases in-sequence delivery will be configured as true.

FIG. 1 is a signal flow diagram 100 illustrating an example problem scenario in which a UE is unable to receive a packet data unit due to RF tune away. According to FIG. 1, the signal flow diagram 100 illustrates the interaction between user equipment (UE) 102, an access network 104, and a core network 106, wherein the UE is a DSDS device. According to the flow chart 100, initially, the access network 104 continuously transmits packet data units (PDUs) to the UE 102 along with sequence numbers (SN's), such as SN0, SN1, SN2, and the like. During transmission, as the UE 102 is a DSDS device, periodically, the radio frequency (RF) resource gets tuned away (depicted as RF Tune Away 1) and the receiving of SN2 gets obstructed. As UE 102 receives SN3 after returning back of the RF resource, it misses SN2 and thus transmits a status PDU message to the access network 104 asking about the status of SN2 (depicted as Tx 1).

Upon receiving the status PDU for SN2, the access network 104 retransmits SN2 to the UE 102. But again the RF resources get tuned away (depicted as RF Tune Away 2) and thus receiving of SN2 fails again. The core network 106 transmits an MT paging message to the access network 104. The process of not receiving SN2 continues for N number of RF tune away sessions. Further, the UE 102 after a determined time period transmits a status PDU message to the access network 104 (depicted as Tx N). The access network 104 transmits SN2 to the UE 102, and also transmits a paging type2 PDU message to the UE 102.

Consider another scenario, in which a circuit-switch/packet-switch (CS/PS) session is established in the third generation of wireless mobile telecommunications technology (3G), various parameters and average signal-to-interference ratio (SIR) and block error rate (BLER) performances are evaluated to determine an "Out of Sync" condition by the physical layer. If the average SIR becomes less than threshold, the physical layer starts reporting Out of Sync to layer 3. When N313 consecutive Out of Sync indications are reported to layer 3, a T313 timer (Typical value of T313 timer is 4-5 seconds) is started. After T313 expiry criteria for radio link failure is fulfilled, a timer T314/T315 is started. If the UE finds a cell before T314/T315 expiry, a cell update procedure is triggered.

FIG. 2 is a signal flow diagram 200 illustrating an example problem scenario in which the UE is unable to transmit a status packet data unit to a network. In some example embodiments, the signal flow diagram 200 includes a similar or the same description as the above-described example embodiments in association with FIG. 1. Redundant descriptions between FIGS. 1 and 2 may be omitted. According to FIG. 2, the signal flow diagram 200 illustrates the interaction between user equipment (UE) 202, an access network 204, and a core network 206, wherein the UE 202 is a DSDS device. According to the flow chart 200, initially, the access network 204 continuously transmits packet data units (PDUs) to the UE 202 along with sequence numbers (SN's), such as SN0, SN1, SN2, and the like. During transmission, as the UE 202 is a DSDS device, periodically, the radio frequency (RF) resource gets tuned away and the receiving of SN2 gets obstructed. As UE 202 receives SN3 after returning back of the RF resource, it misses SN2 and thus transmits a status PDU message to the access network 204 asking about the status of SN2.

After poll timer expiry, the access network 204 retransmits SN2 to the UE 202 with the pollbit set (depicted as Re-Tx1 and SN3 PollBit=1). But again the RF resource gets tuned away and thus receiving of SN2 fails again. While UE 202 is attempting to transmit the status PDU request again, the access network 204 experiences loss of signal in uplink when the UE 202 gives away RF to the protocol stack of SIM2 (stack2) while the protocol stack of SIM1 (stack1) is connected to the access network 204, when there is excessive interference in uplink frequency or when the UE 202 is far away from base station (depicted as Tx 1). In most of the situations, the access network 204 would be able to regain synchronization with the UE 202. However, there is a chance that the access network 204 would not be able to receive the signal from the UE 202, for example, the UE's transmission may not reach the access network 204.

In such cases, if there is pending data not yet acknowledged by the UE 202, the access network 204 may keep re-sending the same PDU after poll timer expiry with the poll bit set (depicted as Re-Tx2, Re-Tx3, and Re-TxN) and the UE 202 receives the poll bit set (depicted as Re-Rx1, Re-Rx2, and Re-Rxi). The UE 202 sends a status PDU to inform the access network 204 about the PDU SN2 that has not been received (depicted as Txj, j<N). If this status PDU is not received at the access network 204 due to reasons described above, the access network 204 would stop DPCH transmission after several retransmissions of same PDU during its waiting time period (depicted as NW stops Tx(D-PCH)). When the SIR measured at the UE 202 drops, a timer T313 is started as defined by the $3^{rd}$ Generation Partnership Project (3GPP). This timer value is generally 3~4 seconds during which the UE 202 continues to monitor the SIR. In most occasions, the T313 timer tends to expire before radio link control (RLC) retransmissions exceed an upper limit and hence RLC recovery procedure is not considered here. Upon T313 timer expiry, the UE 202 releases dedicated channel (DCH) resources and performs cell search procedure to camp and send a Cell Update to the access network 204. If there is any pending paging (e.g., the depicted MT Paging) message from the access network 204 to be sent to the UE 204, it will be delayed until a cell update procedure is performed or a RRC connection release waiting time is reached, whichever is earlier.

FIG. 3 is a signal flow diagram 300 illustrating an example problem scenario in which the UE is unable to transmit a pending data packet data unit to a network. In some example embodiments, the signal flow diagram 300 includes a similar or the same description as the above-described example embodiments in association with FIGS. 1 and 2. Redundant descriptions between FIGS. 1 and 2, and FIG. 3 may be omitted. According to FIG. 3, the signal flow diagram 300 illustrates the interaction between user equipment (UE) 302, an access network 304, and a core network 306, wherein the UE 302 is a DSDS device. According to the flow chart 300, initially, the access network 304 continuously transmits packet data units (PDUs) to the UE 302 along with sequence numbers (SN's), such as SN0, SN1, SN2, and the like. During transmission, as the UE 302 is a DSDS device, periodically, the radio frequency (RF) resource gets tuned away (depicted as RF Tune Away 1, RF Tune Away 2, RF Tune Away N+1, and RF Tune Away N+i) and the receiving of SN2 gets obstructed. As UE 302 receives SN3 after returning back of the RF resource, it misses SN2 and thus transmits a status PDU message to the access network 304 asking about the status of SN2.

After poll timer expiry, the access network 304 retransmits the SN2 to the UE 302 with the pollbit set. But again the RF resource gets tuned away and thus receiving of SN2 fails again. While UE 302 is attempting to transmit the status PDU request again, the access network 304 experiences loss of signal in uplink when the UE 302 gives away RF to stack2 while stack1 is connected to the access network 304, when there is excessive interference in uplink frequency or when the UE 302 is far away from base station. In most of the situations, the access network 304 would be able to regain synchronization with the UE 302. However, there is a chance that the access network 304 would not be able to receive the signal from the UE 302, for example, the UE s transmission may not reach the access network 304.

In such cases, the UE 302 would keep re-sending the pending data PDU after poll timer expiry if L2 acknowledgement is not received from the access network 304 (depicted as Tx1, TxN, Re-Tx1, Re-Tx2 and Re-Txi; the re-sent signal is depicted as UL SN X). If synchronization between the UE 302 and the access network 304 is not restored and the access network 304 not able to receive data in uplink (UL) due to any of the reasons described above, the access network 304 would stop dedicated physical channel (DPCH) transmission after its waiting time period.

When the SIR measured at the UE 302 drops as DPCH transmission is stopped from the access network 304, a timer T313 is started as defined by 3GPP. The duration of this timer is generally 3~4 seconds during which the UE 302 continuously monitors the SIR. A SIR drop at the UE 302 may happen for various reasons, including when the access network 304 stops DPCH transmission. In most occasions, the T313 timer tends to expire before RLC retransmissions exceed the upper limit and hence RLC recovery procedure is not considered here. Upon T313 timer expiry, the UE 302 releases DCH resources and performs cell search procedure to camp and send a Cell Update to the access network 304. If there is any pending paging message from the access network 304 to be sent to the UE 302, it will be delayed until a cell update procedure is performed or a RRC connection release waiting time is reached, whichever is earlier.

Due to multiple instances of RF tune away to other stack, the network may lose uplink synchronization with the DSDS device as the DSDS device's transmitter (TX) is operating in discrete mode. Due to this condition, the access network may turn off its transmission unless uplink synchronization or good cyclic redundancy check (CRC) PDU's are received in uplink. The DSDS device will start a recovery procedure of sending a cell update only after the timer expiry as mentioned in above section. However, the network may release the RRC connection before the DSDS device attempts to re-establish the connection.

In view of the foregoing, methods for improving Paging Type2 performance in Dual Sim Dual Standby (DSDS) device would be desirable.

SUMMARY

Some example embodiments disclose methods for improving Paging Type2 performance in Dual Sim Dual Standby (DSDS) devices.

According to some example embodiments, methods are provided for improving paging performance in Dual Sim Dual Standby (DSDS) devices, the methods include transmitting a status Packet Data Unit (PDU) for a Signaling Radio Bearer (SRB) to a network. The methods further include initiating a first timer in response to the transmitting the status PDU. The methods further include blocking a radio frequency tune away to a first Subscriber Identity Module (SIM) if one or more missing PDUs are not received before expiry of the first timer. The methods further include initiating a second timer in response to the blocking the RF tune away. Furthermore, the methods include retaining, by a second SIM, radio frequency resources until expiry of the second timer or the one or more missing PDUs are received from the network. According to some example embodiments, methods comprise steps of initiating, by the DSDS device, a first timer after a status Packet Data Unit (PDU) for a Signaling Radio Bearer (SRB) is transmitted to the network for indicating one or more missing PDUs, blocking, by the DSDS device, a radio frequency (RF) tune away to a second SIM by initiating a second timer if the one or more missing PDUs are not received before expiry of the first timer, wherein a value of the first timer and the second timer is set based on a status PDU poll timer value and a maximum number of PDU retransmissions configured by the network, and retaining, by the first SIM, Radio Frequency (RF) resources until expiry of the second timer or receiving the one or more missing PDUs from the network.

According to some example embodiments, methods provided for improving paging performance in Dual Sim Dual Standby (DSDS) devices include checking if a status packet data unit (PDU) has been transmitted to a network in response to one or more missed Signaling Radio Bearer (SRB) PDUs. The methods further include monitoring (i) a number of attempts by the network to retransmit a same Packet Data Unit Sequence Number (PDU SN) and (ii) a signal to interference ratio (SIR). The methods further include calculating a SIR gap by comparing two consecutive SIR values. The methods further include detecting a SIR drop based on the calculating the SIR gap. The methods further include determining whether the SIR gap is less than a set threshold after detecting the SIR drop for a set time duration. Furthermore, the methods include triggering a cell search procedure for sending a cell update to the network if the SIR gap remains less than the set threshold after detecting the SIR drop for the set time duration. According to some example embodiments, methods comprise steps of checking, by a DSDS device, if a status packet data unit (PDU) is transmitted to a network for one or more missed Signaling Radio Bearer (SRB) PDUs, monitoring, by the DSDS device, a number of attempts by the network to retransmit the same PDU SN along with a signal to interference ratio (SIR), calculating, by the DSDS device, a Signal-to-interference ratio (SIR) gap by comparing two consecutive SIR values for detecting a sudden SIR drop, monitoring, by the DSDS device, if the SIR gap calculated between two consecutive SIR values is less than a preset threshold after detecting the SIR drop for a preset time duration, and triggering, by the DSDS device, a cell search procedure for sending a cell update to the network if the SIR gap calculated between two consecutive SIR values remains less than a preset threshold after detecting the SIR drop for a preset time duration.

In some example embodiments, the triggering of cell search procedure is performed if number of retransmission of same PDU SN by the network is more than the set threshold and when an SIR drop is detected, wherein the SIR drop is detected when the network has stopped dedicated physical channel (DPCH) transmission to the DSDS device.

According to some example embodiments, methods are provided for improving paging performance in Dual Sim Dual Standby (DSDS) devices include checking if a Packet Data Unit (PDU) for a received Signaling Radio Bearer (SRB) message has been transmitted to a network. The methods further include initiating retransmission of a Packet Data Unit Sequence Number (PDU SN) to the network after expiry of a poll timer, if an L2 acknowledgement is not received from the network. The methods further include monitoring (i) a number of retransmission attempts of the PDU SN to the network and (ii) a measured signal to interference ratio (SIR). The methods further include calculating a SIR gap by comparing two consecutive SIR values. The methods further include detecting a SIR drop based on the calculating the SIR gap. The methods further include monitoring whether the SIR gap is less than a set threshold after detecting the SIR drop for a set time duration. The methods further include triggering a cell search procedure for sending a cell update to the network if the SIR gap is less than the set threshold after detecting the SIR drop for the set time duration. According to some example embodiments, methods comprise steps of checking, by a DSDS device, if a packet data unit (PDU) for a received Signaling Radio Bearer (SRB) message from a layer higher than L2 (hereinafter, "a higher layer") is transmitted to a network, initiating, by the DSDS device, retransmission of the SRB PDU SN to the network after expiry of a poll timer, if an L2 acknowledgement is not received from the network, monitoring, by the DSDS device, a number of attempts of retransmission of the PDU SN to the network along with a measured signal to interference ratio (SIR), calculating, by the DSDS device, an SIR gap by comparing two consecutive SIR values for detecting an sudden SIR drop, monitoring, by the DSDS device, the SIR gap calculated between consecutive SIR values is less than a preset threshold after detecting the SIR drop for a preset time duration, and triggering, by the DSDS device, a cell search procedure for sending a cell update to the network if the SIR gap calculated between consecutive SIR values is less than a preset threshold after detecting the SIR drop for a preset time duration.

In some example embodiments, the triggering of cell search procedure is performed if the number of retransmissions of the same SRB PDU is more than the set threshold and when an SIR drop is detected. Here the SIR drop is detected when the network has stopped dedicated physical channel (DPCH) transmission to the DSDS device.

According to some example embodiments, methods are provided for improving paging performance in Dual Sim Dual Standby (DSDS) devices, the methods include recovering a radio frequency (RF) resource by a first Subscriber Identity Module (SIM) after RF tune away to a second SIM. The methods further include detecting a missed Packet Data Unit (PDU) Sequence Number (SN) after the recovering the RF resource. The methods further include transmitting a status PDU to a network in response to the detecting the missed PDU SN. Furthermore, the methods include performing a paging delay mitigation process in response to detecting the missed PDU SN.

The foregoing has outlined, in general, the various aspects of some example embodiments and is to serve as an aid to better understand the more complete detailed description which is to follow. In reference to such, there is to be a clear understanding that the present example embodiments are not limited to the methods or applications of use described and illustrated herein. It is intended that any other example embodiments that become apparent or obvious from the detailed description or illustrations contained herein are within the scope of the present example embodiments.

BRIEF DESCRIPTION OF THE DRAWINGS

The other objects, features and advantages will occur to those skilled in the art from the following description of some example embodiments and the accompanying drawings in which.

Figure 1:
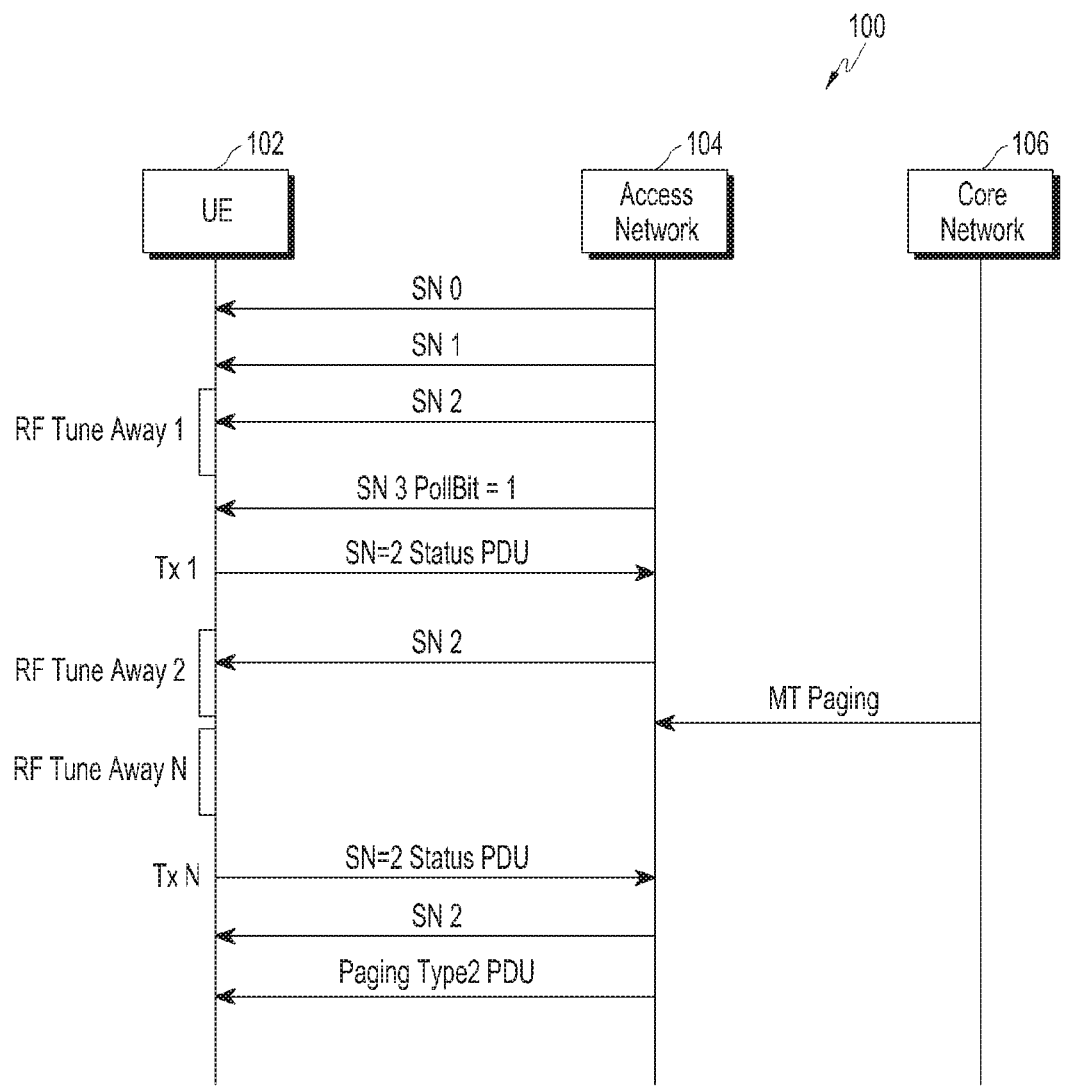
FIG. 1 is a signal flow diagram 100 illustrating an example problem scenario in which a user equipment (UE) is unable to receive a packet data unit due to RF tune away.

Although specific features of some example embodiments are shown in some drawings and not in others, this is done for convenience only as each feature may be combined with any or all of the other features in accordance with some example embodiments.

DETAILED DESCRIPTION

Some example embodiments disclose methods for improving Paging Type2 performance in Dual Sim Dual Standby (DSDS) devices. In the following detailed description of some example embodiments, reference is made to the accompanying drawings that form a part hereof, and in which are shown by way of illustration some example embodiments which may be practiced. These example embodiments are described in sufficient detail to enable those skilled in the art to practice these example embodiments, and it is to be understood that other example embodiments may be utilized and that changes may be made without departing from the scope of the example embodiments. The following detailed description is, therefore, not to be taken in a limiting sense, and the scope of the example embodiments is defined only by the appended claims.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features, integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Some example embodiments provide methods for improving Paging Type2 performance in Dual Sim Dual Standby (DSDS) devices. Various example embodiments are described in the present disclosure to describe the working of the methods, but are not limiting to the scope of the example embodiments.

Some example embodiments herein and the various features and advantages details thereof are explained more fully with reference to the non-limiting example embodiments that are illustrated in the accompanying drawings and detailed in the following description. Descriptions of well-known components and processing techniques are omitted so as to not unnecessarily obscure some example embodiments herein. The examples used herein are intended merely to facilitate an understanding of ways in which some example embodiments herein may be practiced and to further enable those of skill in the art to practice the example embodiments herein. Accordingly, the examples should not be construed as limiting the scope of the example embodiments herein.

According to some example embodiments, methods for improving paging performance in Dual Sim Dual Standby (DSDS) devices include initiating, by the DSDS device, a first timer after a status Packet Data Unit (PDU) for a Signaling Radio Bearer (SRB) is transmitted to a network for indicating one or more missing PDUs. In the CELL_DCH state with an on-going PS session, the DSDS device receives one or more signaling packet data units (PDUs) of a first subscriber identity module (SIM). Upon receiving one or more PDUs, the DSDS device identifies that one or more PDUs are missing, and thus transmits status packet data units (PDUs) to the network indicating a sequence number (SN) of one or more missing PDUs. Upon transmitting the one or more status PDUs, the DSDS device initiates the first timer for the signaling radio bearer, which is transmitted to the network for indicating one or more missing PDUs.

Further, the methods include blocking, by the DSDS device, a radio frequency (RF) tune away to a second SIM by initiating a second timer if the one or more missing PDUs are not received before expiry of the first timer. As the missing PDUs of the first SIM are not yet received before expiry of the first timer, and the second SIM is about to take the radio frequency (RF) resources, the DSDS device blocks the RF tune away to the second SIM by initiating the second timer. Thus, the first SIM continues waiting to receive the one or more missing PDUs, and, also, the second SIM continues waiting for RF resources from the first SIM.

In some example embodiments, the duration of the first timer and the duration of the second timer are set based on a status PDU poll timer value and an upper limit number of PDU retransmissions configured by the network. In some example embodiments, the first timer duration is derived as:

First timer=Status PDU poll timer*number of status PDU retransmissions

In some example embodiments, the second timer duration is derived as:

Second timer=Status PDU poll timer*number of status PDU retransmissions wherein 'number of status PDU retransmissions' is a constant and 'Status PDU poll timer' is configured by the network. In some example embodiments, 'number of status PDU retransmissions' is 5 based on experiments conducted and observed through field logs during DSDS development. The value of the 'number of status PDU retransmissions' may vary based on various parameters and experimental inputs, and a person having ordinarily skilled in the art would understand that the first timer and the second timer durations may be derived by varying the test inputs, without departing from the scope of the example embodiments.

Further, the methods include retaining, by the first SIM, Radio Frequency (RF) resources until expiry of the second timer or receiving the one or more missing PDUs from the network. The first SIM retains RF resources either until the expiry of the second timer or receiving the one or more missing PDUs from the network.

According to some example embodiments, methods are provided for improving paging performance in Dual Sim Dual Standby (DSDS) devices, the methods include checking, by a DSDS device, if a status packet data unit (PDU) is transmitted to a network for one or more missed Signaling Radio Bearer (SRB) PDUs. During exchange of PDUs, the DSDS identifies that one or more SRB PDUs are missing from the received PDUs, and thus transmits a status PDU to the network. But as the DSDS device does not receive any confirmation in the determined time, the DSDS device checks whether the status PDU message for the one or more missing SRB PDUs has been transmitted to the network or not.

Further, the methods include monitoring, by the DSDS device, a number of attempts by the network to retransmit the same PDU sequence number (SN) along with a signal to interference ratio (SIR). Upon transmitting the status PDU to the network, the DSDS device also monitors the number of attempts made by the network to retransmit the same PDU SN along with the SIR.

Further, the methods include calculating, by the DSDS device, a signal-to-interference ratio (SIR) gap, by comparing two consecutive SIR values, for detecting a sudden SIR drop. Further, the methods include monitoring, by the DSDS device, if the SIR gap calculated between two consecutive SIR values is less than a set threshold after detecting the SIR drop for a set time duration. Further, the methods include triggering, by the DSDS device, a cell search procedure for sending a cell update to the network if the SIR gap calculated between two consecutive SIR values remains less than a set threshold after detecting the SIR drop for a set time duration.

In some example embodiments, the triggering of the cell search procedure is performed if a number of retransmissions of the same PDU SN by the network is more than the set threshold and when a SIR drop is detected, wherein the SIR drop is detected when the network has stopped dedicated physical channel (DPCH) transmission to the DSDS device.

According some example embodiments, methods for improving paging performance in Dual Sim Dual Standby (DSDS) devices include checking, by a DSDS device, if a packet data unit (PDU) for a received Signaling Radio Bearer (SRB) message from a higher layer is transmitted to a network.

Further, the methods include initiating, by the DSDS device, retransmission of the SRB PDU SN to the network after expiry of a poll timer, if an L2 acknowledgement is not received from the network. Further, the methods include monitoring, by the DSDS device, a number of attempts of retransmission of the PDU SN to the network along with a measured signal to interference ratio (SIR). Further, the methods include calculating, by the DSDS device, an SIR gap by comparing two consecutive SIR values for detecting a sudden SIR drop.

Further, the methods include monitoring, by the DSDS device, whether the SIR gap calculated between consecutive SIR values is less than a set threshold, after detecting the SIR drop for a set time duration. Further, the methods include triggering, by the DSDS device, a cell search procedure for sending a cell update to the network if the SIR gap calculated between consecutive SIR values is less than a set threshold after detecting the SIR drop for set time duration.

In some example embodiments, the triggering of a cell search procedure is performed if the number of retransmissions of the same SRB PDU is more than the set threshold and when a SIR drop is detected, wherein the SIR drop is detected when the network has stopped dedicated physical channel (DPCH) transmission to the DSDS device.

Figure 4:
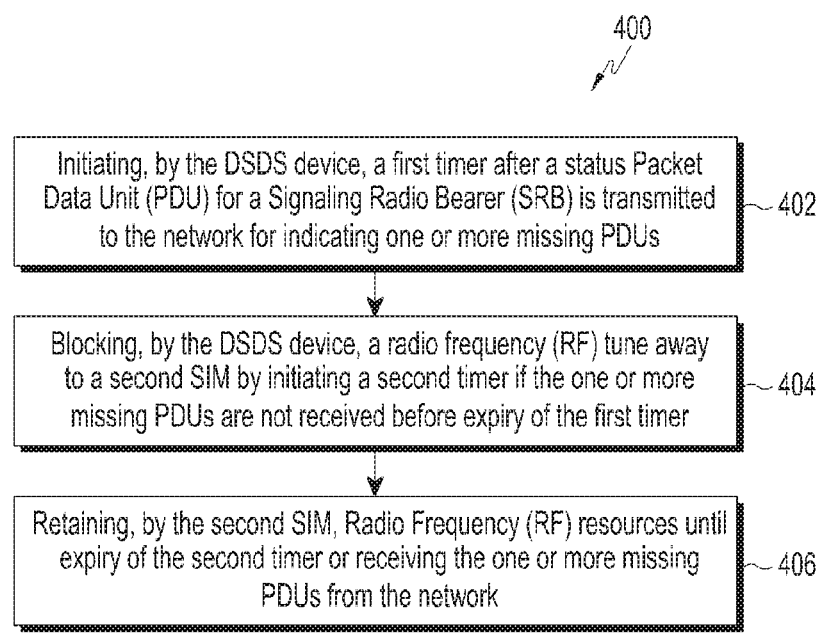
FIG. 4 is a flow chart 400 illustrating methods for improving paging performance in Dual Sim Dual Standby (DSDS) devices in response to a UE being unable to receive a packet data unit due to RF tune away, according to some example embodiments.

FIG. 4 is a flow chart 400 illustrating methods for improving paging performance in Dual Sim Dual Standby (DSDS) devices in response to a UE being unable to receive a packet data unit due to RF tune away, according to some example embodiments. According to the flow chart 400, at operation 402, the DSDS device initiates a first timer after a status Packet Data Unit (PDU) for a Signaling Radio Bearer (SRB) is transmitted to the network to indicate one or more missing PDUs to the network. At operation 404, the DSDS device blocks a radio frequency (RF) tune away to a second SIM by initiating a second timer if the one or more missing PDUs are not received before expiry of the first timer. Further, at operation 406, the first SIM of the DSDS device retains Radio Frequency (RF) resources until expiry of the second timer or receiving the one or more missing PDUs from the network. By blocking RF tune away to the second SIM, the methods increase the probability of receiving the one or more missing PDUs from the network thereby reducing any delay in receiving a paging message.

Figure 5:
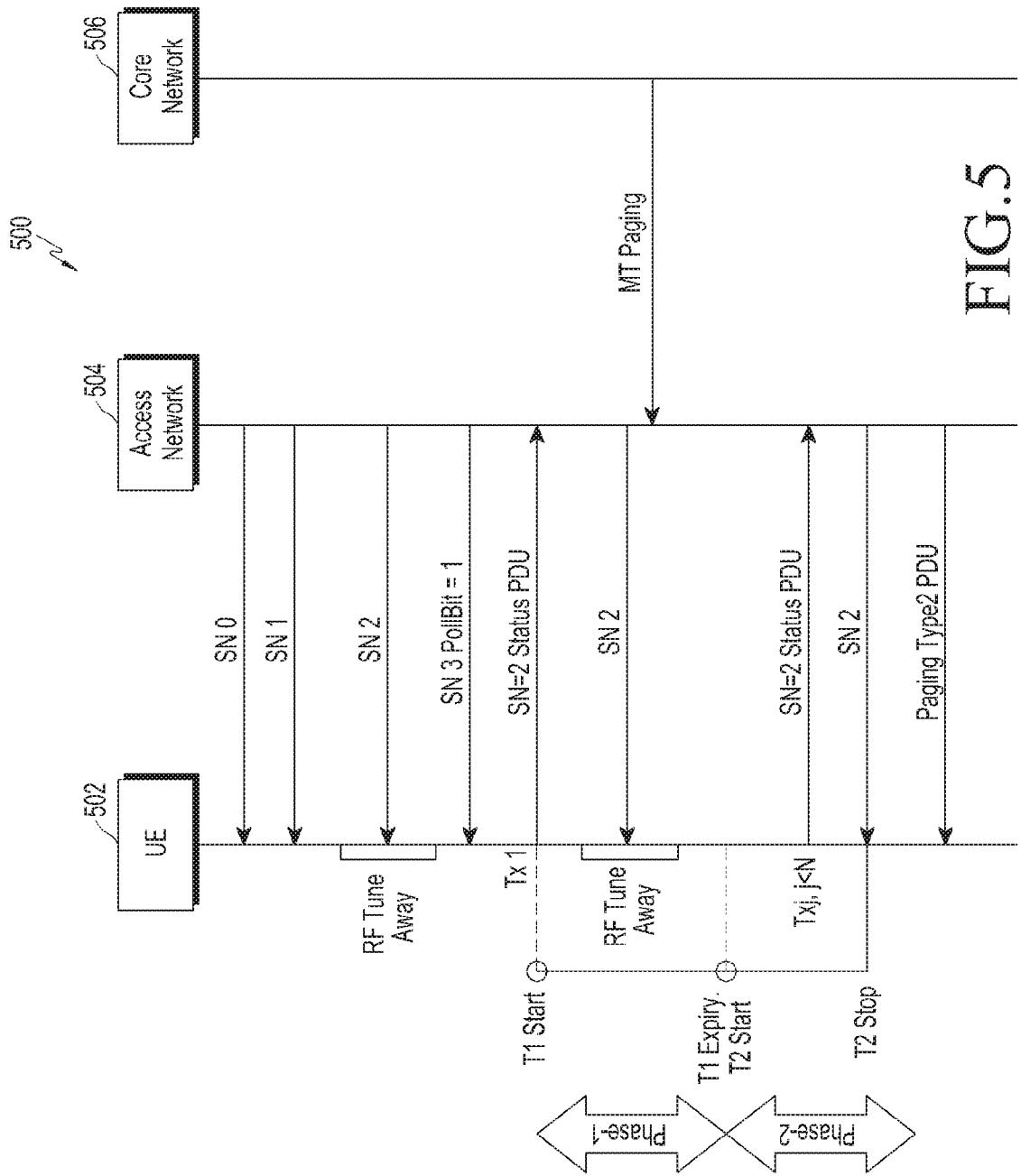
FIG. 5 is a signal flow diagram 500 illustrating a scenario in which methods for improving paging performance in Dual Sim Dual Standby (DSDS) devices are applied in response to a UE being unable to receive a packet data unit due to RF tune away, according to some example embodiments.

FIG. 5 is a signal flow diagram 500 illustrating a scenario in which methods for improving paging performance in Dual Sim Dual Standby (DSDS) devices are applied in response to a UE being unable to receive a packet data unit due to RF tune away, according to some example embodiments. In some example embodiments, the signal flow diagram 500 includes a similar or the same description as the above-described example embodiments in association with FIG. 1. Redundant descriptions between FIGS. 1 and 5 may be omitted. According to FIG. 5, the signal flow diagram 500 indicates interaction between user equipment (UE) 502, an access network 504, and a core network 506, wherein the UE 502 is a DSDS device. According to the signal flow diagram 500, initially, the access network 504 continuously transmits packet data units (PDUs) to the UE 502 along with sequence numbers (SN's), such as SN0, SN1, SN2, and the like. During transmission, as the UE 502 is a DSDS device, periodically the radio frequency (RF) resource gets tuned away and the receiving of SN2 gets obstructed.

As the UE 502 receives SN3 after receiving back the RF resource, it misses SN2 and thus transmits a status PDU message to the access network 504 asking about the status of SN2. When the UE 502 sends the status PDU to the access network 504, a timer T1 is started and the UE 502 waits for the reception of the missed PDU (depicted as Phase-1). In some example embodiments, the timer T1 may be stopped as soon as the missed PDU is received (not depicted). Reception of a missed PDU may be detected as per a mechanism defined by the 3GPP standards.

As there is no guarantee of RF availability, the DSDS device may not receive the missed PDU before the expiry of the timer T1. In this case, a timer T2 is started as soon as the timer T1 is expired after acquiring the RF (depicted as Phase-2). This approach helps to increase the probability of receiving a missed PDU which was not received earlier due to RF tune away activity to the peer stack. During Phase-2, the UE continues to transmit status PDU messages to the access network 504 asking about the status of SN2. The timer T2 is stopped as soon as the DSDS device receives the missed PDU. The timer T2 expires if the missed PDU is not received within a set count.

Figure 6:
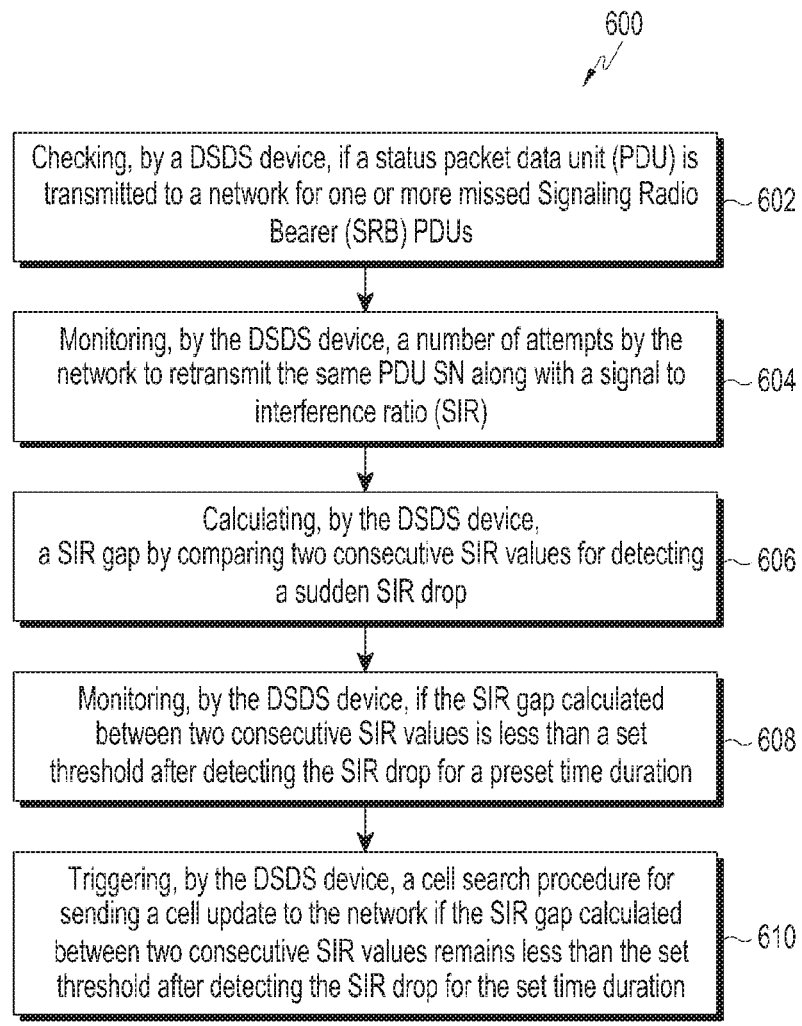
FIG. 6 is a flow chart 600 illustrating methods for improving paging performance in Dual Sim Dual Standby (DSDS) devices in response to a UE being unable to transmit a status PDU to a network, according to some example embodiments.

FIG. 6 is a flow chart 600 illustrating methods for improving paging performance in Dual Sim Dual Standby (DSDS) devices in response to a UE being unable to transmit a status PDU to a network, according to some example embodiments. According to the flow chart 600, at operation 602, the DSDS device checks if a status packet data unit (PDU) is transmitted to a network for one or more missed Signaling Radio Bearer (SRB) PDUs. Further, at operation 604, the DSDS device monitors a number of attempts by the network to retransmit the same PDU SN along with a signal to interference ratio (SIR). Further, at operation 606, the DSDS device calculates a signal-to-interference ratio (SIR) gap by comparing two consecutive SIR values for detecting a sudden SIR drop.

Figure 2:
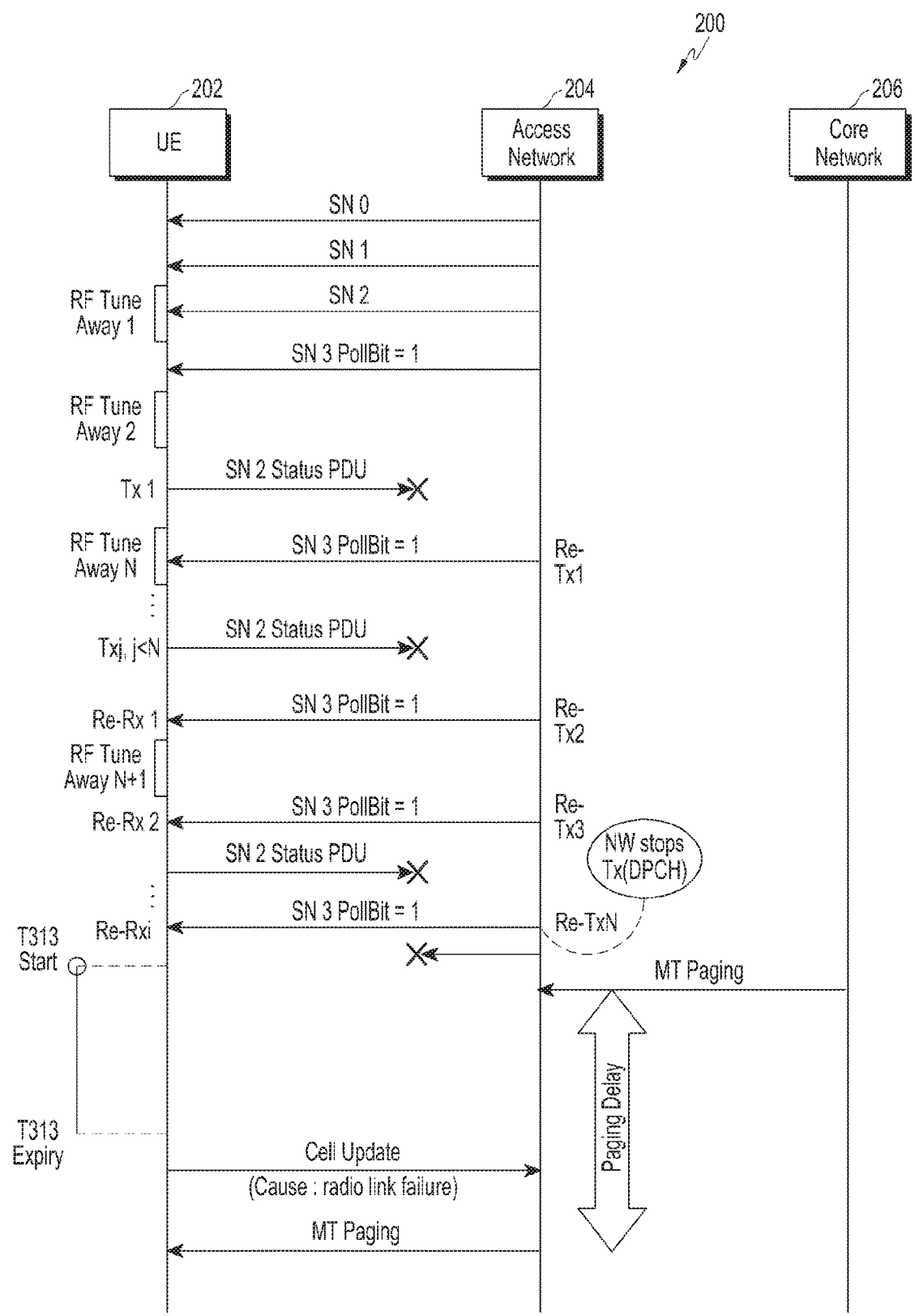
FIG. 2 is a signal flow diagram 200 illustrating an example problem scenario in which a UE is unable to transmit a status packet data unit (PDU) to a network.

Further, at operation 608, the DSDS device monitors if the SIR gap calculated between two consecutive SIR values is less than a set threshold after detecting the SIR drop for a set time duration. Further, at operation 610, the DSDS device triggers a cell search procedure for sending a cell update to the network if the SIR gap calculated between two consecutive SIR values remains less than a set threshold after detecting the SIR drop for set time duration. By triggering a cell search procedure for sending a cell update to the network at operation 610, the methods reduce the delay in receiving a paging message that would otherwise occur by waiting for the expiration of a T313 timer as described further in association with FIG. 2.

Figure 7:
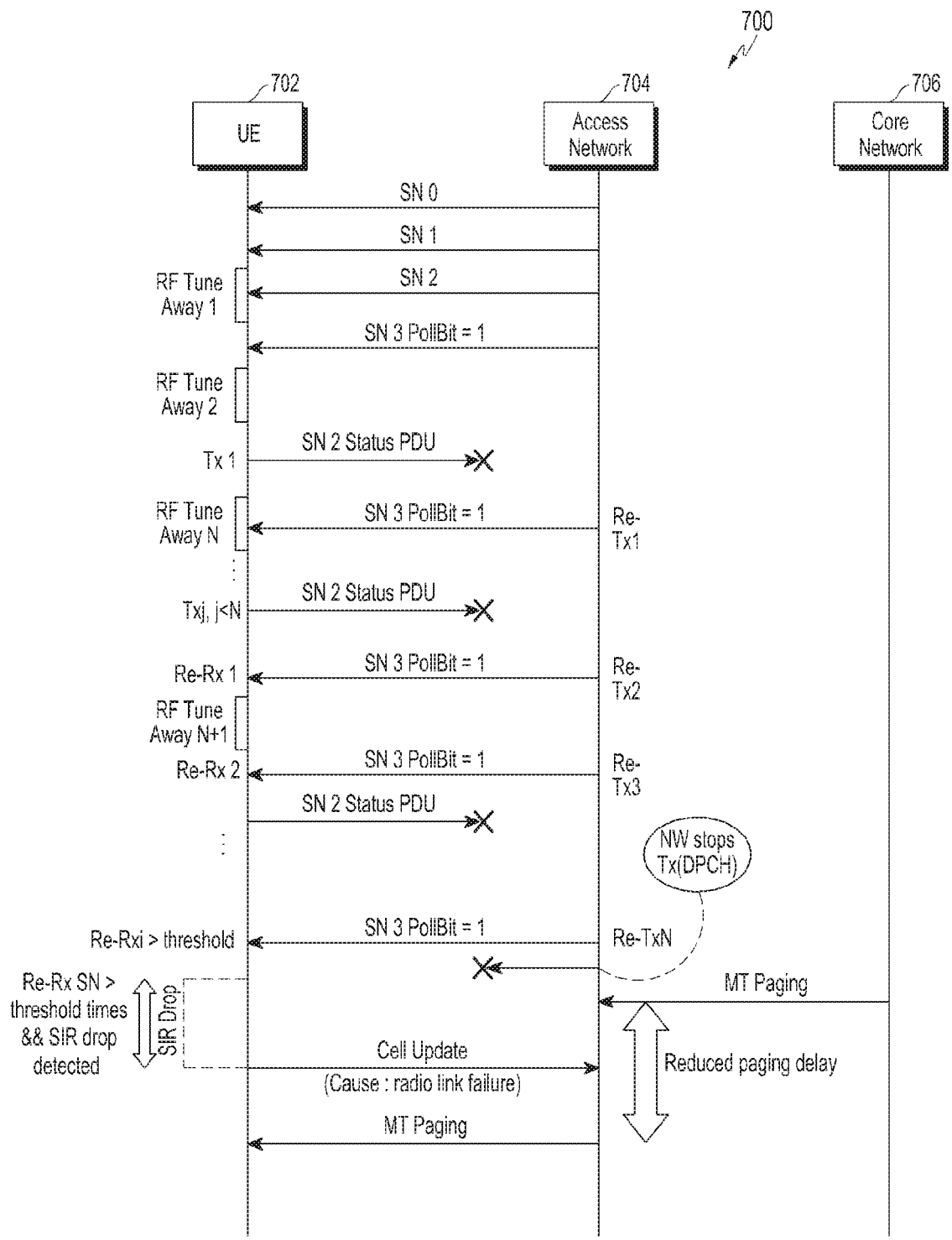
FIG. 7 is a signal flow diagram 700 illustrating a scenario in which methods for improving paging performance in Dual Sim Dual Standby (DSDS) devices are applied in response to a UE being unable to transmit a status PDU to a network, according to some example embodiments.

FIG. 7 is a signal flow diagram 700 illustrating a scenario in which methods for improving paging performance in Dual Sim Dual Standby (DSDS) devices are applied in response to a UE being unable to transmit a status PDU to a network, according to some example embodiments. In some example embodiments, the signal flow diagram 700 includes a similar or the same description as the above-described example embodiments in association with FIGS. 1 and 2. Redundant descriptions between FIGS. 1 and 2, and FIG. 7 may be omitted. According to FIG. 7, the signal flow diagram 700 illustrates interaction between a user equipment (UE) 702, an access network 704, and a core network 706, wherein the UE 702 is a DSDS device. According to the signal flow diagram 700, initially, the access network 704 continuously transmits packet data units (PDUs) to the UE 702 along with sequence numbers (SN's), such as SN0, SN1, SN2, and the like. During transmission, as the UE 702 is a DSDS device, periodically, the radio frequency (RF) resource gets tuned away and the receiving of SN2 gets obstructed.

As the UE 702 receives SN3 after returning back of the RF resources, it misses SN2 and thus transmits status PDU message to the access network 704 asking about the status of SN2. If the status PDU sent from the UE 702 is not reaching the access network 704, or the access network 704 is not able to receive status PDU due to any of the reasons mentioned in association with FIG. 2, the access network 704 continues retrying the transmission of same PDU. In some example embodiments depicted in FIG. 7, the access network 704 is unable to receive status PDUs from the UE 702, therefore the access network 704 continues re-transmitting the same PDU. According to some example embodiments, the UE 702 keeps track of the number of transmissions of same PDU from the access network 704 along with a measured SIR.

As soon as the measured SIR degrades at the UE 702, the SIR drop is detected by a SIR drop detection algorithm. A SIR drop may occur due to the access network 704 stopping DPCH transmission. As soon as SIR gap between a previous SIR and a current SIR is greater than a T1 value threshold, the difference between the current SIR and the previous SIR is continuously monitored to determine whether the difference is less than T2 threshold for a T time period. On completion of the T time period, the UE 702 makes a decision about triggering a cell search procedure for sending a cell update. The decision is made based on a first condition in which a number of transmissions of the same PDU by the access network 704 is greater than a threshold and a second condition in which a SIR drop is detected (thereby identifying that the access network 704 has stopped DPCH transmission). If both conditions are satisfied, the UE 702 will not wait for a timer T313 expiry and instead will start the cell update procedure immediately. According to at least some example embodiments, operations described herein as being performed by the SIR drop detection algorithm may be performed by at least one processor executing program code that includes instructions corresponding to the operations, as described further below.

Figure 8:
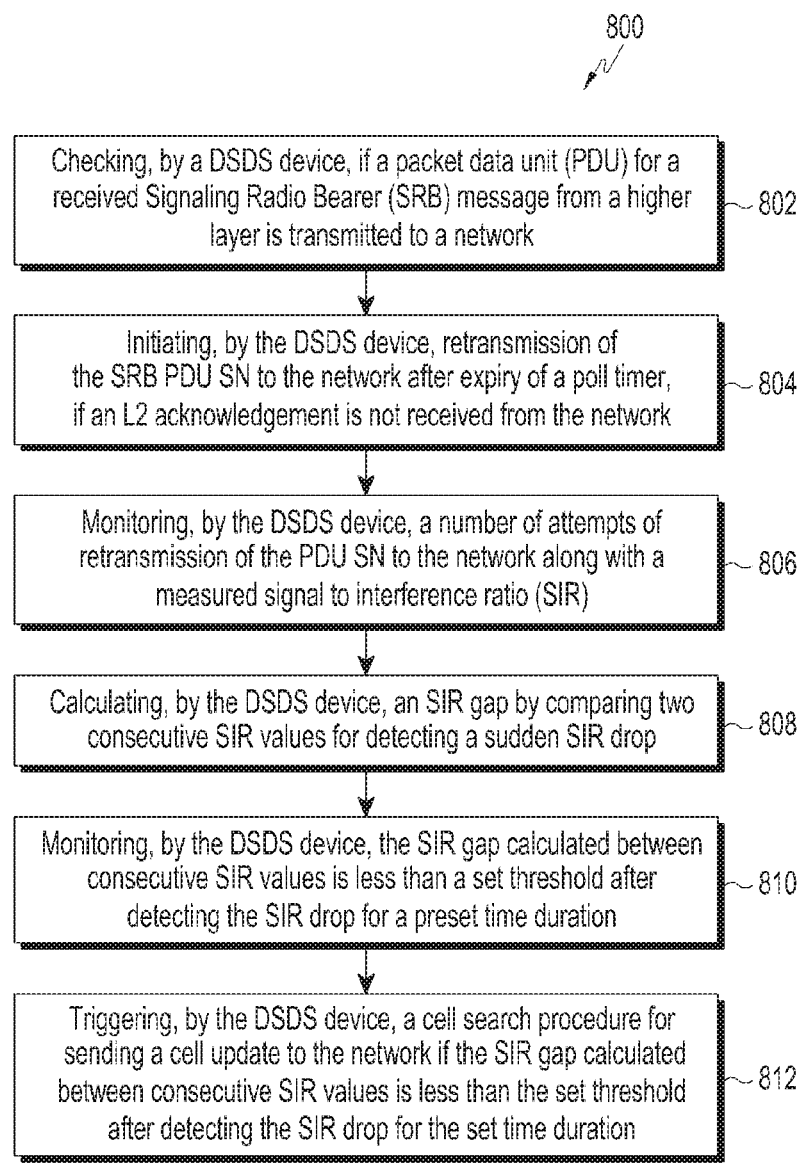
FIG. 8 is a flow chart 800 illustrating methods for improving paging performance in Dual Sim Dual Standby (DSDS) devices in response to a UE being unable to transmit a pending data PDU to a network, according to some example embodiments.

FIG. 8 is a flow chart 800 illustrating methods for improving paging performance in Dual Sim Dual Standby (DSDS) devices in response to a UE being unable to transmit a pending data PDU to a network, according to some example embodiments. According to the flow chart 800, at operation 802, the DSDS device checks if a packet data unit (PDU) for a received Signaling Radio Bearer (SRB) message from a higher layer is transmitted to a network. Further, at operation 804, the DSDS device initiates retransmission of the SRB PDU SN to the network after expiry of a poll timer, if an L2 acknowledgement is not received from the network. Further at operation 806, the DSDS device monitors a number of attempts to retransmit the PDU SN to the network along with a measured signal to interference ratio (SIR).

Figure 3:
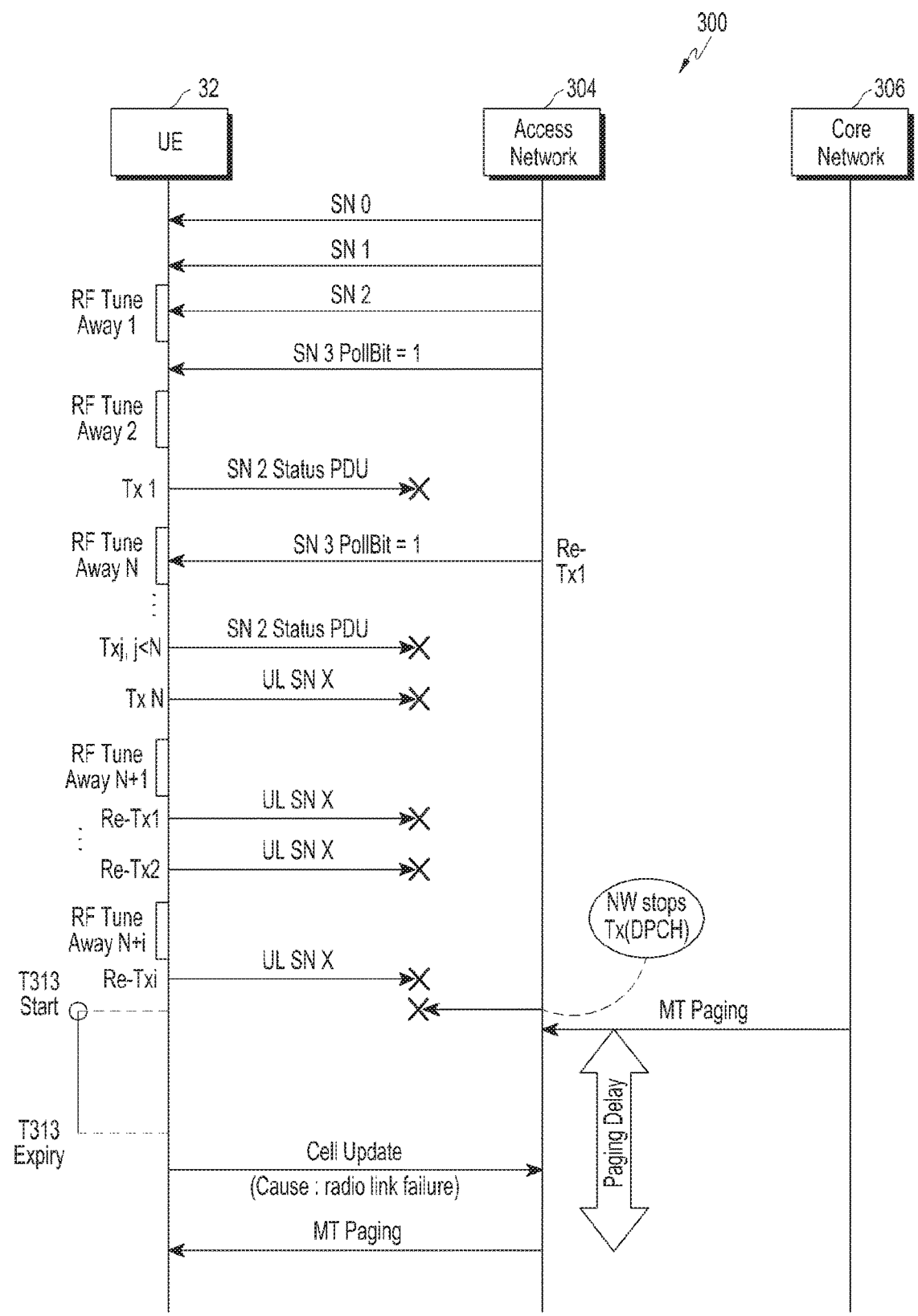
FIG. 3 is a signal flow diagram 300 illustrating an example problem scenario in which a UE is unable to transmit a pending data PDU to a network.

Further, at operation 808, the DSDS device calculates a SIR gap by comparing two consecutive SIR values for detecting a sudden SIR drop. Further, at operation 810, the DSDS device determines whether the SIR gap calculated between consecutive SIR values is less than a set threshold after detecting the SIR drop for set time duration. Further, at operation 812, the DSDS device triggers a cell search procedure for sending a cell update to the network if the SIR gap calculated between consecutive SIR values is less than a set threshold after detecting the SIR drop for set time duration. By triggering a cell search procedure for sending a cell update to the network at operation 812, the methods reduce the delay in receiving a paging message that would otherwise occur by waiting for the expiration of a T313 timer as described further in association with FIG. 3.

Figure 9:
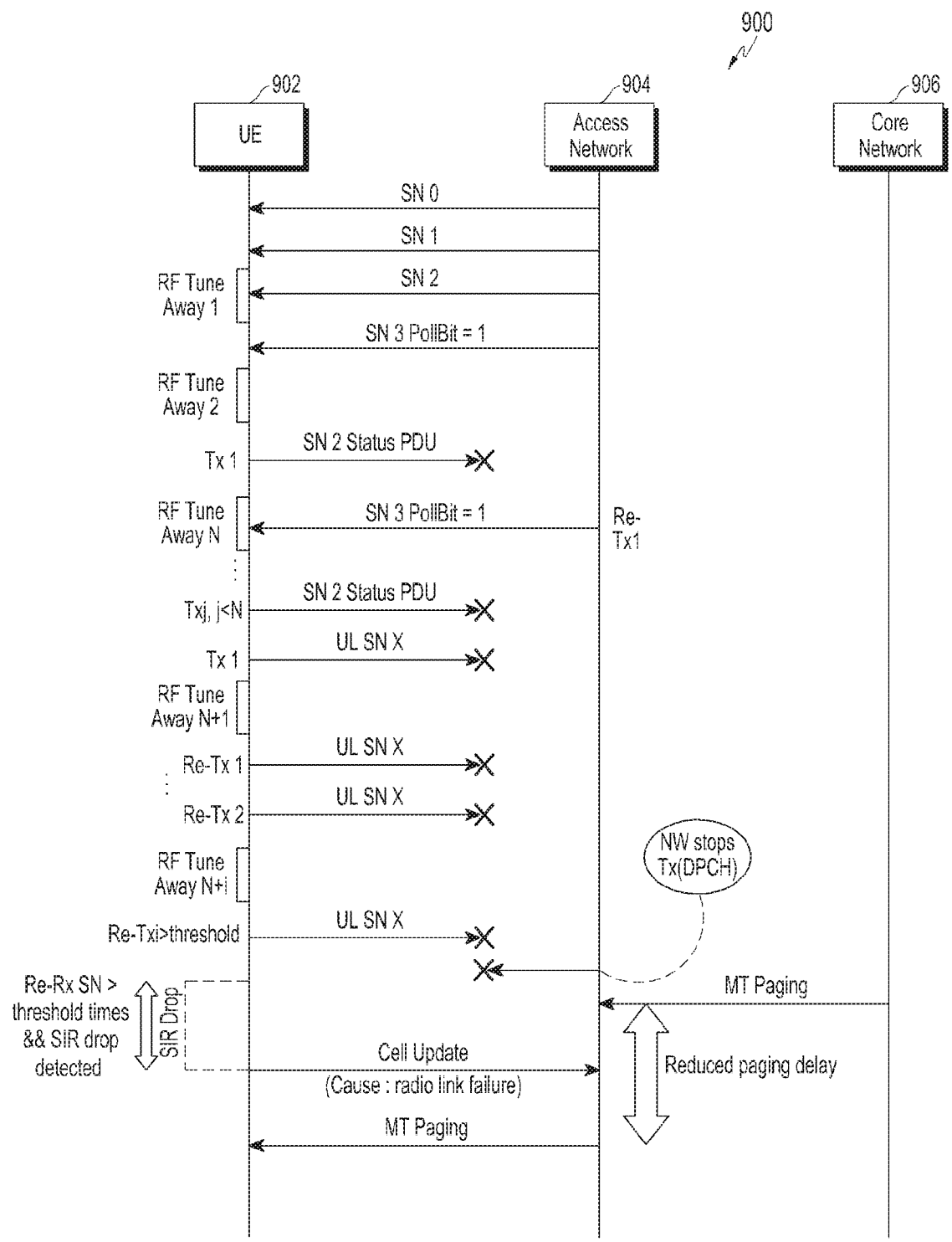
FIG. 9 is a signal flow diagram 900 illustrating a scenario in which methods for improving paging performance in Dual Sim Dual Standby (DSDS) devices are applied in response to a UE being unable to transmit a pending data PDU to a network, according to some example embodiments.

FIG. 9 is a signal flow diagram 900 illustrating a scenario in which methods for improving paging performance in Dual Sim Dual Standby (DSDS) devices are applied in response to a UE being unable to transmit a pending data PDU to a network, according to some example embodiments. In some example embodiments, the signal flow diagram 900 includes a similar or the same description as the above-described example embodiments in association with FIGS. 1-3 and 7-8. Redundant descriptions between FIGS. 1-3, 7-8 and FIG. 9 may be omitted. According to FIG. 9, the flow chart 900 illustrates interaction between a user equipment (UE) 902, an access network 904, and a core network 906, wherein the UE 902 is a DSDS device. According to the signal flow diagram 900, initially, the access network 904 continuously transmits packet data units (PDUs) to the UE 902 along with sequence numbers (SN's), such as SN0, SN1, SN2, and the like. During transmission, as the UE 902 is a DSDS device, periodically, the radio frequency (RF) resource gets tuned away and the receiving of SN2 gets obstructed.

As the UE 902 receives SN3 after returning back of the RF resources, it misses SN2 and thus transmits status PDU message to the access network 904 asking about the status of SN2. The UE 902 keeps track of a number of transmissions of the same PDU sent from itself to the access network 904, along with a measured SIR. As soon as the measured SIR degrades at the UE 902, the SIR drop is detected by SIR drop detection methods. An SIR drop may occur due to the access network 904 stopping DPCH transmission. According to at least some example embodiments, operations described herein as being performed by the SIR drop detection methods may be performed by at least one processor executing program code that includes instructions corresponding to the operations, as described further below.

As soon as an SIR gap between a previous SIR and a current SIR is greater than a T1 value threshold, the difference between the current SIR and the previous SIR is continuously monitored to determine whether the difference is less than a T2 threshold for a T time period. On completion of the T time period, the UE 902 makes a decision about triggering a cell search procedure for sending a cell update. The decision is made based on a first condition in which a number of transmissions of the same PDU is greater than a threshold and a second condition in which a SIR drop is detected (thereby identifying that the access network 904 has stopped DPCH transmission). If both conditions are satisfied, then the UE 902 will not wait for a timer T313 expiry and instead will start the cell update procedure immediately.

Figure 10:
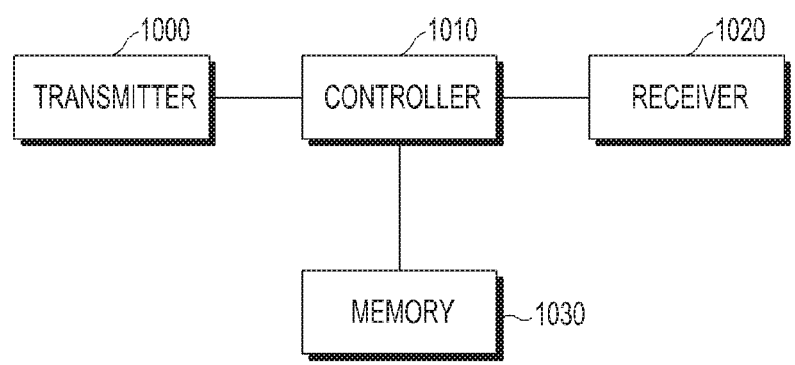
FIG. 10 illustrates an internal structure of a dual standby (DSDS) device for improving paging type2 performance, according to some example embodiments.

FIG. 10 illustrates an internal structure of a dual standby (DSDS) device for improving paging type2 performance. Referring to FIG. 10, the dual standby (DSDS) device include a transmitter (1000), a controller (1010), a receiver (1020), and a memory (1030). The controller (1010) controls the overall operation of the DSDS device. The transmitter (1000) transmits signal and messages under a control of the controller (1010). The receiver (1020) receives signal and messages under a control of the controller (1010). The memory (1030) stores programs, equations and data related to the operation corresponding to the method for improving Paging Type2 performance in Dual Sim Dual Standby (DSDS) devices in FIGS. 4 to 9. The controller (1010) may be a processor. A transceiver may include the transmitter (1000) and the receiver (1020).

A DSDS device including a processor, a memory, an RF transceiver, a first SIM and a second SIM may be configured to perform the operations described above in association with FIGS. 1 to 9. DSDS device 100 may be, but is not limited to, a mobile phone, a smart phone, a Personal Digital Assistant (PDA), a tablet, a phablet, a consumer electronic device, or any other electronic device with dual SIM capability. The memory may store instructions to be executed by the processor. In some example embodiments, the memory may include a Random Access Memory (RAM), a Read Only Memory (ROM), another type of dynamic or static storage device, a removable memory card, and/or another type of memory that may store information and instructions for execution by the processor.

The processor may be configured to execute instructions stored in the memory. The processor may include one or more of a microprocessor, a controller, a digital signal processor (DSP), an application specific integrated circuit (ASIC), a field-programmable gate array (FPGA), or equivalent discrete or integrated logic circuitry. Additionally, the functions attributed to the processor, in this disclosure, may be embodied as software, firmware, hardware or any combination thereof.

It may be further appreciated by one of ordinary skill in the art that various example logic blocks, modules, circuits, methods, and algorithms described in connection with the example embodiments described herein may be implemented in hardware, computer software, or a combination thereof. In order to clarify interchangeability between hardware and software, various example components, blocks, modules, circuits, methods, and algorithms have been generally described in light of their functionality. Whether such functionality is implemented in hardware or software relies on a particular application and design limitations given to the overall system. The disclosed functionality may be embodied in various manners on each particular application by one of ordinary skill in the art, but such determination should not be interpreted as causing departure from the category of the present disclosure.

Various example logic blocks, modules, and circuits described herein in some example embodiments may be implemented or performed by a general-purpose processor, digital signal processor (DSP), application specific integrated circuit (ASIC), field programmable gate array (FPGA) or other programmable logic device, discrete gate or transistor logic, discrete hardware components, or their combinations designed to carry out the functions disclosed herein. The general-purpose processor may be a microprocessor. Alternatively, the processor may be a common processor, controller, microcontroller, or state machine. Further, the processor may be implemented in a combination of computing devices, for example, a combination of a DSP and a microprocessor, multiple microprocessors, one or more microprocessors integrated with a DSP core, or any other configurations.

The methods and algorithms described in connection with some example embodiments described herein may be directly implemented in hardware, a software module run by the processor, or in a combination thereof. The software module may reside in a random access memory (RAM), flash memory, read only memory (ROM), erasable programmable ROM (EPROM), electrically erasable programmable ROM (EEPROM), registers, hard disk, removable disk, compact disc ROM (CD-ROM) or any other type of storage medium known in the art. The storage medium may be combined with the processor so that the processor reads information out of the storage medium and record information in the storage medium. Alternatively, the storage medium may be integrated with the processor. The processor and storage medium may reside in an ASIC.

In some example embodiments, the above-described functions may be implemented in hardware, software, firmware, or any combination thereof. When implemented in software, the functions may be stored as one or more instructions or codes in a computer readable medium or transmitted through the same. The computer readable medium includes both a communication medium and computer storage medium including any medium facilitating to transfer a computer program from one place to another. The storage medium may be any available medium accessible by a general-purpose or special-purpose computer. As non-limiting examples, such computer readable medium may include a RAM, ROM, EEPROM, CD-ROM or other optical disc storage, magnetic disk storage or other magnetic storage devices, or any other medium available for transferring or storing program code means in a desired form of instructions or data structures and accessible by a general-purpose or special-purpose computer or special-purpose processor. For example, when the software is transmitted from a website, server, or other remote source using a coaxial cable, optical fiber cable, twisted pair, digital subscriber line (DSL), or infrared (IR) rays, or wireless techniques using wireless and microwaves, the coaxial cable, optical fiber cable, twisted pair, DSL, IR rays, and wireless techniques using wireless and microwaves belong to the definition of the computer readable medium. As used herein, the term "disk" or "disc" encompasses compact disc (CD), laser disc, optical disc, digital versatile disc (DVD), floppy disk, and Blu-ray disc, and here, the disk reproduces data generally magnetically while the disc reproduces data optically using laser beams. Combinations of those described above should be included in the computer readable medium.

In the preceding detailed description of some example embodiments, reference is made to the accompanying drawings that form a part hereof, and in which are shown by way of illustration specific example embodiments. These example embodiments are described in sufficient detail to enable those skilled in the art to practice the example embodiments, and it is to be understood that other example embodiments may be utilized and that changes may be made without departing from the scope of the example embodiments. The following detailed description is, therefore, not to be taken in a limiting sense, and the scope of the example embodiments is defined only by the appended claims.

What is claimed is:

1. A method performed by a Dual Sim Dual Standby (DSDS) device, comprising;
  recovering a radio frequency (RF) resource by a first Subscriber Identity Module (SIM) after RF tune away to a second SIM;
  detecting a missed Packet Data Unit (PDU) Sequence Number (SN) after the recovering the RF resource;
  transmitting a status PDU to a network in response to the detecting the missed PDU SN; and
  performing a paging delay mitigation process in response to detecting the missed PDU SN,
  wherein the performing the paging delay mitigation process includes,
  initiating a first timer, having a first duration, in response to the transmitting the status PDU; and
  determining whether the missing PDU SN has been received during the first duration after the initiating the first timer,
  blocking RF tune away to the second SIM in response to the determining that the missing PDU SN has not been received during the first duration; and
  initiating a second timer, having a second duration, in response to the blocking RF tune away.

2. The method of claim 1, wherein the performing the paging delay mitigation process includes,
  unblocking RF tune away to the second SIM in response to receiving the missing PDU SN or expiration of the second duration after the initiating the second timer.

3. The method of claim 1, wherein the performing the paging delay mitigation process includes,
  determining (i) a number of attempts by the network to retransmit a same PDU SN and (ii) two consecutive signal to interference ratio (SIR) values.

4. The method of claim 3, wherein the performing the paging delay mitigation process includes,
  calculating a SIR gap by comparing the two consecutive SIR values; and
  detecting a SIR drop based on the calculating the SIR gap.

5. The method of claim 4, wherein the performing the paging delay mitigation process includes,
  triggering a cell search procedure for sending a cell update to the network if (i) the SIR gap remains less than a SIR gap threshold after detecting the SIR drop for a set time duration and (ii) the number of attempts by the network to retransmit the same PDU SN is more than a retransmission threshold.

6. The method of claim 1, wherein the performing the paging delay mitigation process includes,
  retransmitting a PDU SN to the network after expiration of a poll timer if an L2 acknowledgement is not received from the network.

7. The method of claim 6, wherein the performing the paging delay mitigation process includes,
  determining (i) a number of attempts to retransmit a same PDU SN to the network and (ii) two consecutive signal to interference ratio (SIR) values;
  calculating a SIR gap by comparing the two consecutive SIR values; and
  detecting a SIR drop based on the calculating the SIR gap.

8. The method of claim 7, wherein the performing the paging delay mitigation process includes,
  triggering a cell search procedure for sending a cell update to the network if (i) the SIR gap is less than a SIR gap threshold after detecting the SIR drop for a set time duration and (ii) the number of attempts to retransmit the same PDU SN to the network is more than a retransmission threshold.

9. An apparatus in a Dual Sim Dual Standby (DSDS) device, the apparatus comprising:
  a controller configured to
    recover a radio frequency (RF) resource by a first Subscriber Identity Module (SIM) after RF tune away to a second SIM,
    detect a missed Packet Data Unit (PDU) Sequence Number (SN) after the recovering the RF resource, and
    perform a paging delay mitigation process in response to detecting the missed PDU SN; and
  a transceiver configured to transmit a status PDU to a network in response to detecting the missed PDU SN,
  wherein the controller is further configured to initiate a first timer, having a first duration, in response to transmitting the status PDU and determine whether the missing PDU SN has been received during the first duration after initiating the first timer, and wherein the controller is further configured to block RF tune away to the second SIM in response to determining that the missing PDU SN has not been received during the first duration, and initiate a second timer, having a second duration, in response to blocking RF tune away.

10. The apparatus of claim 9, wherein the controller is further configured to unblock RF tune away to the second SIM in response to receiving the missing PDU SN or expiration of the second duration after initiating the second timer.

11. The apparatus of claim 9, wherein the controller is further configured to determine (i) a number of attempts by the network to retransmit a same PDU SN and (ii) two consecutive signal to interference ratio (SIR) values.

12. The apparatus of claim 11, wherein the controller is further configured to calculate a SIR gap by comparing the two consecutive SIR values; and detect a SIR drop based on calculating the SIR gap.

13. The apparatus of claim 12, wherein the controller is further configured to trigger a cell search procedure for sending a cell update to the network if (i) the SIR gap remains less than a SIR gap threshold after detecting the SIR drop for a set time duration and (ii) the number of attempts by the network to retransmit the same PDU SN is more than a retransmission threshold.

14. The apparatus of claim 9, wherein the transceiver is further configured to retransmit a PDU SN to the network after expiration of a poll timer if an L2 acknowledgement is not received from the network.

15. The apparatus of claim 14, wherein the controller is further configured to determine (i) a number of attempts to retransmit a same PDU SN to the network and (ii) two consecutive signal to interference ratio (SIR) values; calculate a SIR gap by comparing the two consecutive SIR values; and detect a SIR drop based on calculating the SIR gap.

16. The apparatus of claim 15, wherein the controller is further configured to trigger a cell search procedure for sending a cell update to the network if (i) the SIR gap is less than a SIR gap threshold after detecting the SIR drop for a set time duration and (ii) the number of attempts to retransmit the same PDU SN to the network is more than a retransmission threshold.

* * * * *